(12) United States Patent
Abe (10) Patent No.: US 9,100,126 B2
(45) Date of Patent: Aug. 4, 2015

(54) OPTICAL RECEPTION DEVICE AND OPTICAL RECEPTION CONTROL METHOD

(75) Inventor: Junichi Abe, Tokyo (JP)

(73) Assignee: NEC CORPORATION, Tokyo (JP)

( * ) Notice: Subject to any disclaimer, the term of this patent is extended or adjusted under 35 U.S.C. 154(b) by 216 days.

(21) Appl. No.: 13/511,539

(22) PCT Filed: Oct. 25, 2010

(86) PCT No.: PCT/JP2010/068821
§ 371 (c)(1),
(2), (4) Date: May 23, 2012

(87) PCT Pub. No.: WO2011/065163
PCT Pub. Date: Jun. 3, 2011

(65) Prior Publication Data
US 2012/0269513 A1    Oct. 25, 2012

(30) Foreign Application Priority Data
Nov. 24, 2009  (JP) ................................. 2009-266065

(51) Int. Cl.
*H04B 10/06* (2006.01)
*H04B 10/00* (2013.01)
*H04B 10/532* (2013.01)
*H04B 10/2569* (2013.01)
*H04B 10/69* (2013.01)

(52) U.S. Cl.
CPC .......... *H04B 10/532* (2013.01); *H04B 10/2569* (2013.01); *H04B 10/69* (2013.01)

(58) Field of Classification Search
CPC .................................................. H04B 10/6162
See application file for complete search history.

(56) References Cited

U.S. PATENT DOCUMENTS 7,336,729 B2 *  2/2008  Agazzi ........................... 375/316
7,602,322 B2 * 10/2009  Tanimura et al. ............. 341/118
(Continued)

FOREIGN PATENT DOCUMENTS

| JP | 2008-153863 A | 7/2008 |
| JP | 2008-158363 A | 7/2008 |

(Continued)

OTHER PUBLICATIONS

Stranneby, Digital Signal Processing:DSP & Applications, 2001, Butterworth-Heinemann, p. 33.*

(Continued)

*Primary Examiner* — Ken Vanderpuye
*Assistant Examiner* — Jai Lee
(74) *Attorney, Agent, or Firm* — Sughrue Mion, PLLC (57) ABSTRACT

An optical reception device (10) includes an electrical signal converter (110) that converts an optical signal serving as an input polarization multiplexed signal into electrical signals of respective polarization components, a signal processor (120) that executes digital signal processing for digital signals generated by executing A/D conversion processing, and a phase difference output unit (130) that detects a phase difference generated between the polarization components of the optical signal based on the signals having undergone digital signal processing, and outputs information representing the phase difference. The signal processor (120) compensates for the distortion of the optical signal based on the information representing the phase difference. Even if rapidly varying PMD exists, the optical reception device prevents degradation of the reception precision by executing signal processing in optimal identification phases for the respective polarization components of a received polarization multiplexed signal.

11 Claims, 9 Drawing Sheets

(56) References Cited

U.S. PATENT DOCUMENTS

| | | | |
|---|---|---|---|
| 7,606,498 B1 * | 10/2009 | Wu et al. | 398/152 |
| 7,675,441 B2 * | 3/2010 | Sheng et al. | 341/120 |
| 2005/0196176 A1 * | 9/2005 | Sun et al. | 398/152 |
| 2007/0092259 A1 * | 4/2007 | Bontu et al. | 398/147 |
| 2008/0145066 A1 | 6/2008 | Hoshida | |
| 2009/0074427 A1 | 3/2009 | Liu | |
| 2009/0074428 A1 * | 3/2009 | Liu | 398/208 |
| 2009/0208224 A1 | 8/2009 | Kikuchi | |
| 2012/0084619 A1 * | 4/2012 | Kuschnerov et al. | 714/752 |

FOREIGN PATENT DOCUMENTS

| | | |
|---|---|---|
| JP | 2008-205654 A | 9/2008 |
| JP | 2010-193204 A | 9/2010 |
| WO | 2007/132503 A1 | 11/2007 |
| WO | 2009/035513 A1 | 3/2009 |

OTHER PUBLICATIONS

Vaseghi, Advanced Digital Signal Processing and Noise Reduction, 2006, pp. 195-196.*
Charlet, Coherent detection associated with digital signal processing for fiber optics communication, 2008, Elsevier, p. 1021-1022.*
Hauske et al., Optical Performance Monitoring from FIR Filter Coefficients in Coherent Receivers, 2008, Optical Society of America.*
Hauske et al., DGD Estimation from FIR Filter Taps in Presence of Higher Order PMD, 2008, IEEE.*
Communication dated Jul. 31, 2012, issued by the Japanese Patent Office in counterpart Application No. 2011-543178.
Seb J. Savory, "Digital filters for coherent optical receivers", Optics Express, Jan. 21, 2008, pp. 804-817, vol. 16, No. 2.
Han Sun, et al., "Real-time measurements of a 40 Gb/s coherent system", Optics Express, Jan. 21, 2008, pp. 873-879, vol. 16, No. 2.

* cited by examiner

OPTICAL RECEPTION DEVICE AND OPTICAL RECEPTION CONTROL METHOD

CROSS REFERENCE TO RELATED APPLICATIONS

This application is a National Stage of International Application No. PCT/JP2010/068821 filed Oct. 25, 2010, claiming priority based on Japanese Patent Application No. 2009-266065, filed Nov. 24, 2009, the contents of all of which are incorporated herein by reference in their entirety.

TECHNICAL FIELD

The present invention relates to an optical reception device and optical reception control method and, more particularly, to an optical reception device and optical reception control method using a digital coherent reception scheme in high-speed optical communication.

BACKGROUND ART

With growing demands for higher speeds and larger capacities of data communications in recent networks, optical communication technologies which implement high-speed, large-capacity data communications are becoming important more and more. In the optical communication technologies, a coherent reception scheme, which is a reception scheme using the nature of interference of light, can obtain a higher reception sensitivity and has a high affinity for multilevel modulation such as QAM (Quadrature Amplitude Modulation), compared to reception schemes using modulation of modulating the intensity of light, such as OOK (On-Off Keying) and DPSK (Differential Phase Shift Keying) widely applied to conventional large-capacity optical communication systems.

However, the conventional coherent reception scheme cannot achieve stable reception owing to a frequency/phase offset of local oscillation (LO) light or polarization fluctuations generated in the respective polarization components of a multiplexed input optical signal.

To solve these problems, there is proposed a digital coherent reception scheme capable of stable reception by compensating for a frequency/phase offset and polarization fluctuations (patent literature 1). This scheme is implemented because a high-speed A/D (Analog to Digital) converter becomes available thanks to higher operation speeds and larger capacities of recent electronic devices, and digital signal processing for a signal obtained by digitally converting an optical signal becomes possible.

Patent literature 1 discloses an optical reception device which converts a received optical signal into a digital signal by A/D conversion processing, calculates an error from an optimal sampling timing in A/D conversion processing based on the digital signal, and corrects the sampling timing of A/D conversion processing.

Figure 9:
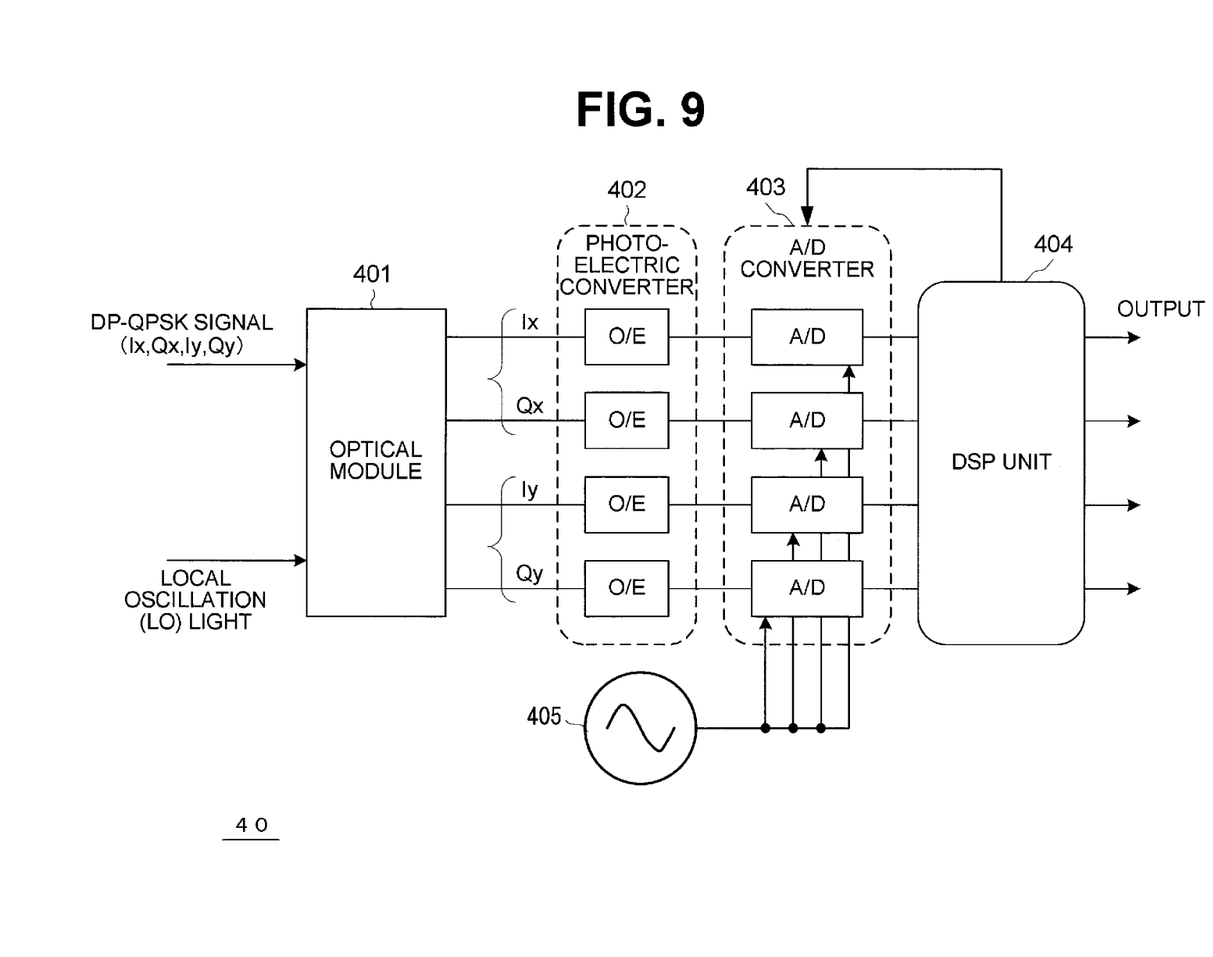
FIG. 9 is a block diagram showing the arrangement of an optical reception device using a conventional digital coherent reception method.

FIG. 9 shows the arrangement of an optical reception device 40 using a digital coherent reception scheme as an example of the optical reception device proposed in patent literature 1.

As shown in FIG. 9, the optical reception device 40 demultiplexes a DP (Dual-Polarization: polarization multiplexed)-QPSK (Quadrature Phase Shift Keying) signal serving as an input signal into four channels (Ix, Qx, Iy, and Qy) via an optical element (90° hybrid). Photoelectric (O/E) converters convert components of the respective channels into analog signals. Then, A/D converters which perform sampling at timings synchronized with A/D identification clocks convert the converted analog signals into digital signals.

In the optical reception device 40, a DSP unit extracts an error from the optimal sampling timing in the A/D converter based on the A/D-converted digital signal, and corrects the sampling timing of the A/D converter. Accordingly, the optical reception device 40 can compensate for a frequency/phase offset and polarization fluctuations. By performing signal processing for the digital signal, the optical reception device 40 can also execute advanced waveform equalization processing such as wavelength dispersion compensation.

CMA (Constant Modulus Algorithm) is known as a conventional technique for implementing polarization fluctuation compensation among various compensations mentioned above (contents of a detailed principle of CMA are disclosed in, e.g., non-patent literature 1). For example, non-patent literature 2 discloses a receiver having a good transmission characteristic with little performance degradation by CMA at 50 ps in 1st-order polarization mode dispersion (PMD) in which the wavelength dispersion amount is 15,000 ps/nm at a 40-Gbps transmission rate.

RELATED ART LITERATURE

Patent Literature

Patent Literature 1: Japanese Patent Laid-Open No. 2008-205654

Non-Patent Literature

Non-Patent Literature 1: Seb J. Savory, "Digital filters for coherent optical receivers", OPTICS EXPRESS, Vol. 16, No. 2, pp. 804-817, (2008).

Non-Patent Literature 2: Han Sun, Kuang-Tsan Wu, and Kim Roberts, "Real-time measurements of a 40 Gb/s coherent system", OPTICS EXPRESS, Vol. 16, No. 2, pp. 873-879, (2008).

DISCLOSURE OF INVENTION

Problem to be Solved by the Invention

In general, the A/D converter in the conventional digital coherent receiver shown in FIG. 9 does not perform sufficient oversampling for one symbol of an input signal due to restriction of the circuit speed (for example, two samples per symbol at most). The sampling timing of A/D conversion synchronized with the A/D identification clock needs to be adjusted at high precision so that the identification phase (sampling timing) of the A/D converter coincides with the peak level of the reception waveform.

However, even if the sampling timing of A/D conversion is to be adjusted, the optimal sampling timing of A/D conversion processing shifts between the X polarization channel and the Y polarization channel when PMD generated on a transmission line varies temporally to cause polarization fluctuations so that the arrival times (reception timings) of the X and Y polarization components of a polarization multiplexed signal serving as an input optical signal vary.

The polarization fluctuations can be represented by a DGD (Differential Group Delay) indicating a shift between the arrival times (reception timings) of the X and Y polarization components of a polarization multiplexed signal.

Figure 10:
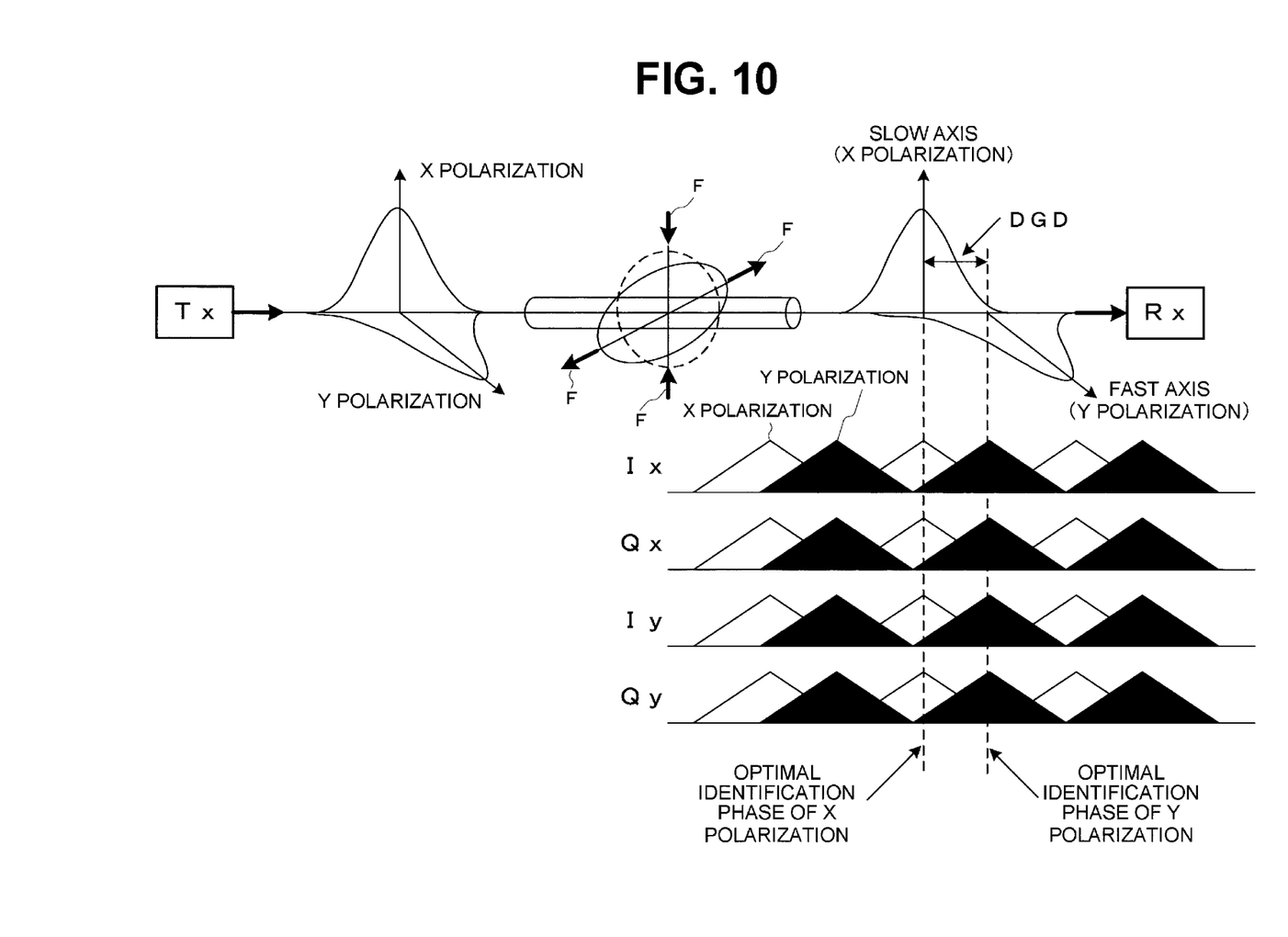
FIG. 10 is a view conceptually showing a state in which the waveform arrival times of the respective polarization components of a polarization multiplexed signal vary due to 1st-order PMD generated on a transmission line.

FIG. 10 is a view conceptually showing a state in which the waveform arrival times of the X and Y polarization components of a polarization multiplexed signal vary owing to 1st-order PMD generated on the transmission line.

As shown in FIG. 10, if 1st-order PMD occurs under the influence of temperature variations, mechanical vibrations, or the like on the transmission line, a shift (DGD) is generated between the polarization components of the received polarization multiplexed signal, that is, between the reception timing (arrival time) of the optimal identification phase of the X polarization component (slow axis) and that of the optimal identification phase of the Y polarization component (fast axis).

The magnitude of the shift, i.e., DGD of the optimal identification phase between the polarization channels of the polarization multiplexed signal has an arbitrary high-speed temporal variation characteristic because it is affected by temperature variations, mechanical vibrations, or the like on the optical communication signal transmission line.

As described above, when temporally varying PMD exists on a transmission line, it is difficult for the conventional digital coherent reception device as disclosed in patent literature 1 to detect variations of the DGD (shift between the optimal identification phases of respective polarization components) in a received polarization multiplexed signal. As a result, the reception precision degrades.

The present invention has been made to solve the above-described problems, and has as its exemplary object to provide an optical reception device which, even if rapidly varying PMD exists, extracts a shift amount between a set identification phase and an optimal identification phase for each polarization component of a received polarization multiplexed signal, and executes signal processing in the optimal identification phase to prevent degradation of the reception precision.

Means of Solution to the Problem

To achieve the above exemplary object, according to the present invention, there is provided an optical reception device comprising an electrical signal converter that converts, into electrical signals, respective polarization components of a polarization multiplexed signal forming an optical signal in which the polarization components are multiplexed, a signal processor that executes A/D conversion processing for the electrical signals output from the electrical signal converter and digital signal processing for digital signals generated by the A/D conversion processing, and a phase difference output unit that detects a phase difference generated between the polarization components of the polarization multiplexed signal based on the digital signals output from the signal processor, and outputs information representing the phase difference, wherein the signal processor compensates for a distortion of the polarization multiplexed signal based on the information representing the phase difference that is output from the phase difference output unit.

According to the present invention, there is provided an optical reception control method comprising the steps of converting, into electrical signals, respective polarization components of a polarization multiplexed signal forming an optical signal in which the polarization components are multiplexed, executing A/D conversion processing for the electrical signals to generate digital signals, executing digital signal processing for the digital signals, detecting a phase difference generated between the polarization components of the polarization multiplexed signal based on the digital signals having undergone the digital signal processing and outputting information representing the phase difference, and compensating for a distortion of the polarization multiplexed signal based on the information representing the phase difference.

Effect of the Invention

According to the present invention, the respective polarization components of a received polarization multiplexed signal are A/D-converted into digital signals. A phase difference generated between the digital signals corresponding to the respective polarization components is detected to obtain a phase difference between the polarization components of the received polarization multiplexed signal. Based on the obtained phase difference, the distortion of the received polarization multiplexed signal can be compensated.

Even if PMD exists on a transmission line and polarization fluctuations by a rapidly varying DGD occur in a received polarization multiplexed signal, the optical reception device according to the present invention can compensate for the distortion of the polarization multiplexed signal based on a phase difference between the polarization components. The optical reception device according to the present invention can prevent degradation of the reception precision.

BEST MODE FOR CARRYING OUT THE INVENTION

Exemplary embodiments of the present invention will now be described with reference to the accompanying drawings.

First Exemplary Embodiment

An optical reception device according to the first exemplary embodiment of the present invention receives a polarization multiplexed signal serving as an optical signal in which respective polarization components are multiplexed, detects a phase difference generated between the polarization components of the received polarization multiplexed signal, and corrects a distortion generated in the received polarization multiplexed signal, thereby preventing degradation of the reception precision.

Figure 1:
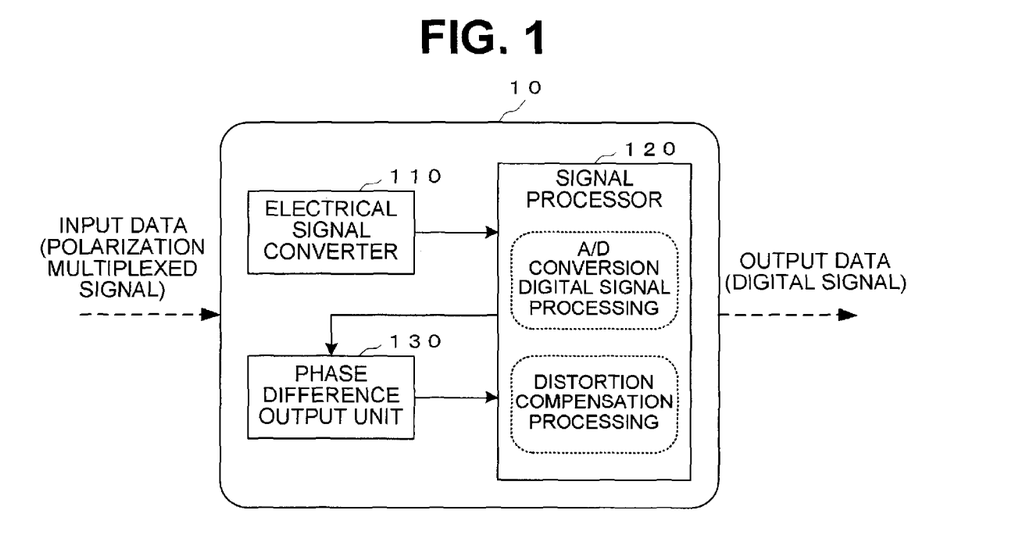
FIG. 1 is a block diagram showing the arrangement of an optical reception device according to the first exemplary embodiment of the present invention.

As shown in FIG. 1, an optical reception device 10 according to this exemplary embodiment includes an electrical signal converter 110, signal processor 120, and phase difference output unit 130.

The electrical signal converter 110 photoelectrically converts signals corresponding to the respective polarization components of a polarization multiplexed signal serving as a received optical signal, and outputs electrical signals corresponding to the respective polarization components of the received polarization multiplexed signal.

The signal processor 120 executes A/D conversion processing for the electrical signals output from the electrical signal converter 110, and digital signal processing for digital signals output by the A/D conversion processing.

Also, the signal processor 120 compensates for the distortion of the polarization multiplexed signal received by the optical reception device 10 based on information representing a phase difference generated between the polarization components of the polarization multiplexed signal that is output from the phase difference output unit 130 to be described below.

The phase difference output unit 130 detects a phase difference generated between the polarization components of the polarization multiplexed signal received by the optical reception device 10 based on the digital signals having undergone digital signal processing by the signal processor 120, and outputs information representing the phase difference to the signal processor 120.

Note that each function of the optical reception device 10 according to this exemplary embodiment is implemented by installing a computer program (software) in a computer including a CPU (Central Processing Unit), memory, and interface mounted in the optical reception device 10. Each function is implemented by various hardware resources of the computer and the computer program in cooperation with each other. Note that the computer program may be provided in a state in which it is stored in a computer-readable recording medium.

Each function of the optical reception device 10 according to this exemplary embodiment can also be implemented by integrating the program algorithm of the function into a large-scale semiconductor integrated circuit such as FPGA (Field Programmable Gate Array) or ASIC (Application Specific Integrated Circuit).

The operation of the optical reception device 10 according to this exemplary embodiment will be explained with reference to a flowchart shown in FIG. 2.

Figure 2:
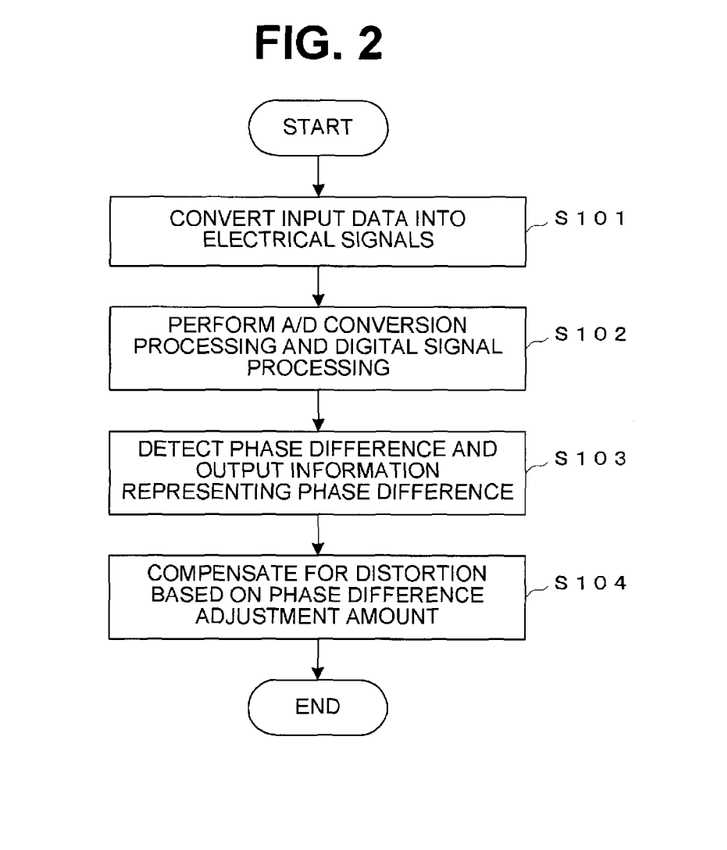
FIG. 2 is a flowchart showing the operation of the optical reception device according to the first exemplary embodiment.

As shown in FIG. 2, when the optical reception device 10 according to this exemplary embodiment receives a polarization multiplexed signal serving as input data, the electrical signal converter 110 converts the received polarization multiplexed signal into electrical signals for respective polarization components multiplexed on the polarization multiplexed signal (S101).

After converting the received polarization multiplexed signal into electrical signals for the respective polarization components, the signal processor 120 executes A/D conversion processing for these electrical signals, and outputs digital signals corresponding to the electrical signals of the respective polarization components. In addition, the signal processor 120 executes digital signal processing for the digital signals output by A/D conversion processing (S102).

After the signal processor 120 performs digital signal processing for the digital signals upon A/D conversion processing, the phase difference output unit 130 detects a phase difference generated between the polarization components based on the digital signals having undergone digital signal processing, and outputs information representing the phase difference to the signal processor 120 (S103).

After the phase difference output unit 130 outputs the information representing the phase difference to the signal processor 120, the signal processor 120 compensates for the distortion of the received polarization multiplexed signal based on the information representing the phase difference (S104).

In this manner, the optical reception device 10 according to this exemplary embodiment converts the respective polarization components of a received polarization multiplexed signal into digital signals, and detects a phase difference generated between the digital signals corresponding to the respective polarization components. Based on the phase difference, the optical reception device 10 can compensate for the distortion of the received polarization multiplexed signal.

Even when PMD exists on a transmission line and a rapidly varying DGD is generated in a received polarization multiplexed signal, the optical reception device according to the present invention can prevent degradation of the reception precision by performing signal processing in optimal identification phases for the respective polarization components.

Second Exemplary Embodiment

An optical reception device according to the second exemplary embodiment of the present invention detects a phase difference generated between the polarization components of a received polarization multiplexed signal serving as an optical signal in which the respective polarization components are multiplexed, and corrects the phase difference. Especially, the optical reception device executes A/D conversion at optimal sampling timings for the respective polarization components of a received polarization multiplexed signal.

In the optical reception device according to this exemplary embodiment, a received polarization multiplexed signal is a DP-QPSK signal in which polarization components of four channels (Ix, Qx, Iy, and Qy) are multiplexed. In the description of this exemplary embodiment, the DP-QPSK signal is an input signal received by the optical reception device.

Figure 3:
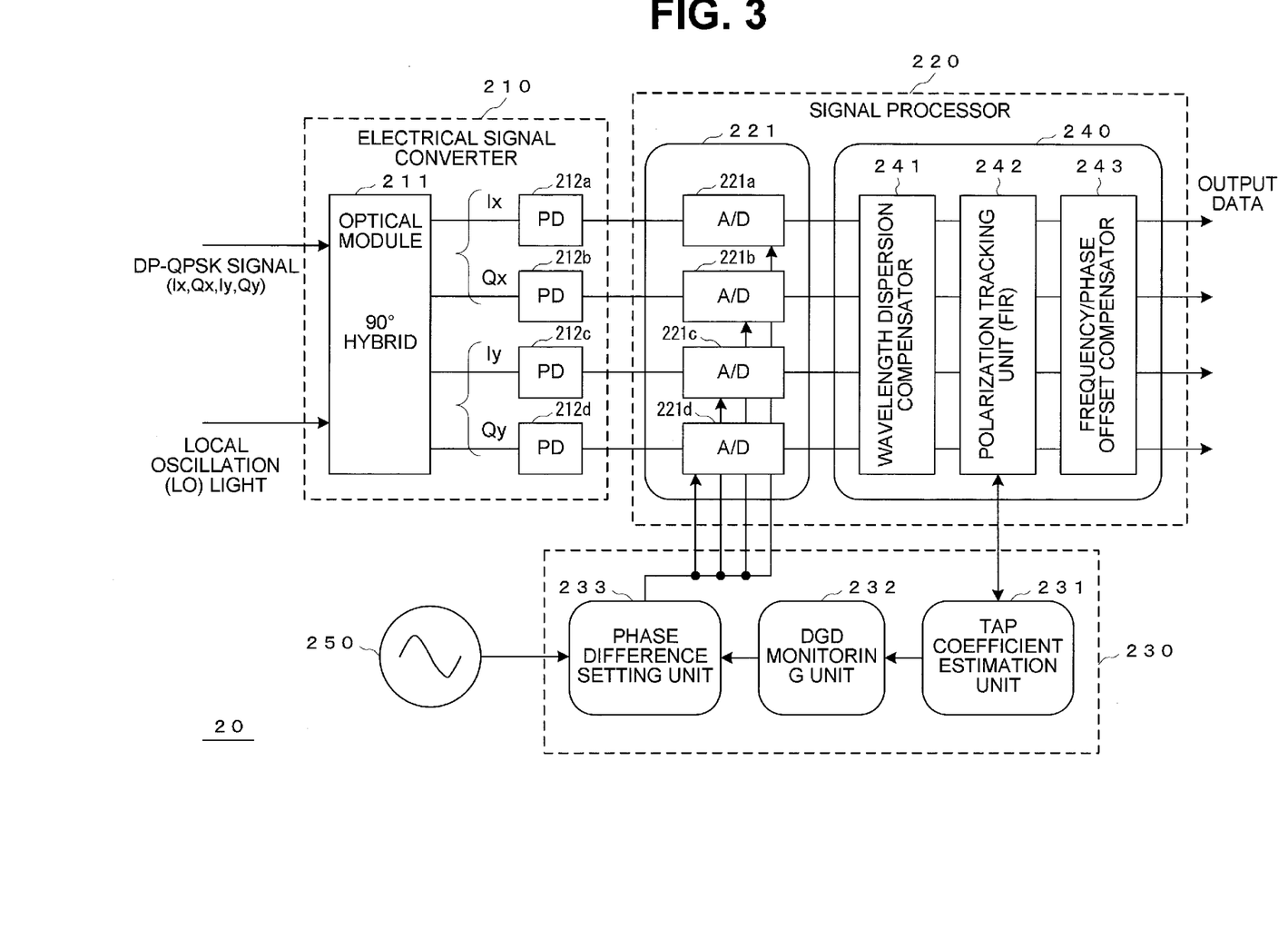
FIG. 3 is a block diagram showing the arrangement of an optical reception device according to the second exemplary embodiment of the present invention.

As shown in FIG. 3, an optical reception device 20 according to this exemplary embodiment includes an electrical signal converter 210, a signal processor 220, a phase difference output unit 230, and an A/D identification clock generator 250 which outputs A/D identification clocks synchronized with sampling timings when executing A/D conversion.

The electrical signal converter 210 includes an optical module 211 and photodiodes 212a to 212d.

When a received DP-QPSK signal is input to the optical module 211, the optical module 211 modulates it into polarization component signals of the four channels (Ix, Qx, Iy, and Qy). The function of the optical module 211 is implemented by, e.g., a 90° hybrid.

The photodiodes (to be referred to as "PD"s hereinafter) 212a to 212d photoelectrically convert the respective polarization component signals modulated by the optical module, and output electrical signals corresponding to the respective polarization component signals.

The signal processor 220 includes an A/D converter 221 and distortion compensation processor 240.

The A/D converter 221 converts the electrical signals output from the PDs 212a to 212d into digital signals by A/D conversion.

More specifically, as shown in FIG. 3, an A/D converter 221a A/D-converts an electrical signal corresponding to a polarization component signal of the Ix channel that has been photoelectrically converted by the PD 212a, out of the respective polarization component signals modulated by the optical module 211, thereby outputting a digital signal corresponding to the polarization component signal of the Ix channel. Similarly for polarization component signals of the remaining three channels, A/D converters 221b, 221c, and 221d corresponding to the respective polarization component signals A/D-convert electrical signals corresponding to the respective polarization component signals, outputting digital signals corresponding to the respective polarization component signals.

The distortion compensation processor 240 includes a wavelength dispersion compensator 241 which compensates for wavelength dispersion generated on a transmission line, a polarization tracking unit 242, and a frequency/phase offset compensator 243.

The wavelength dispersion compensator 241 executes digital signal processing for the digital signals output from the A/D converter 221, thereby compensating for wavelength dispersion generated on a transmission line such as an optical fiber. Wavelength dispersion of a DP-QPSK signal generated on a transmission line such as an optical fiber can be compensated by, for example, digital signal processing using an FIR (Finite Impulse Response) filter, FDE (Frequency Domain Equalization), or the like.

The polarization tracking unit 242 executes digital signal processing for the digital signals having undergone wavelength dispersion compensation by the wavelength dispersion compensator 241, thereby canceling linear coupling of the X and Y polarization components of the DP-QPSK signal that is caused by polarization fluctuations generated on the transmission line such as an optical fiber. Linear coupling of the respective polarization components of a DP-QPSK signal can be canceled using, for example, CMA described in non-patent literature 1 described above.

The frequency/phase offset compensator 243 executes digital signal processing for the digital signals for which the polarization tracking unit 242 has canceled linear coupling of the respective polarization components, thereby compensating for an offset arising from the difference in frequency or phase between local oscillation (LO) light and the DP-QPSK signal serving as input data. Frequency/phase offset compensation can be implemented by a method such as the m power estimation method, DD-PLL (Decision Directed-Phase Look Loop) method, or training method which is a well-known technique.

The phase difference output unit 230 detects a phase difference generated between the polarization component signals based on the digital signals having undergone digital signal processing by the distortion compensation processor 240, and outputs information representing the phase difference to the A/D converter 221.

The phase difference output unit 230 includes a tap coefficient estimation unit 231, DGD monitoring unit 232, and phase difference setting unit 233.

The tap coefficient estimation unit 231 estimates tap coefficients representing the structure of an FIR filter used the CMA method executed by the polarization tracking unit 242 of the distortion compensation processor 240, and sets the structure of the FIR filter.

The DGD monitoring unit 232 detects and monitors a DGD between the polarization component signals of the DP-QPSK signal based on the tap coefficients of the FIR filter that have been estimated by the tap coefficient estimation unit 231.

The phase difference setting unit 233 obtains a phase difference generated between the polarization component signals of the DP-QPSK signal based on the DGD monitored by the DGD monitoring unit 232, and outputs information representing the phase difference to the A/D converter 221.

The function of the phase difference output unit 230 will be described in more detail with reference to FIGS. 4 to 6.

The phase difference output unit 230 derives a phase difference between the polarization component signals of the DP-QPSK signal based on the DGD between the polarization component signals of the DP-QPSK signal that can be detected from the tap coefficients representing the structure of the FIR filter used the CMA method executed by the polarization tracking unit 242.

The CMA method executed by the polarization tracking unit 242 is a so-called blind equalization method. This method adjusts the tap coefficients of a butterfly FIR filter which receives polarization component signals of the four channels (Ix, Qx, Iy, and Qy) to always equalize the powers of the X and Y polarization components of a DP-QPSK signal.

The relationship between the tap coefficients of the FIR filter used in the CMA method and the DGD between the polarization component signals of the DP-QPSK signal will be explained. Note that the principle and detailed contents of the CMA method are disclosed in, e.g., non-patent literature 1.

Figure 4:
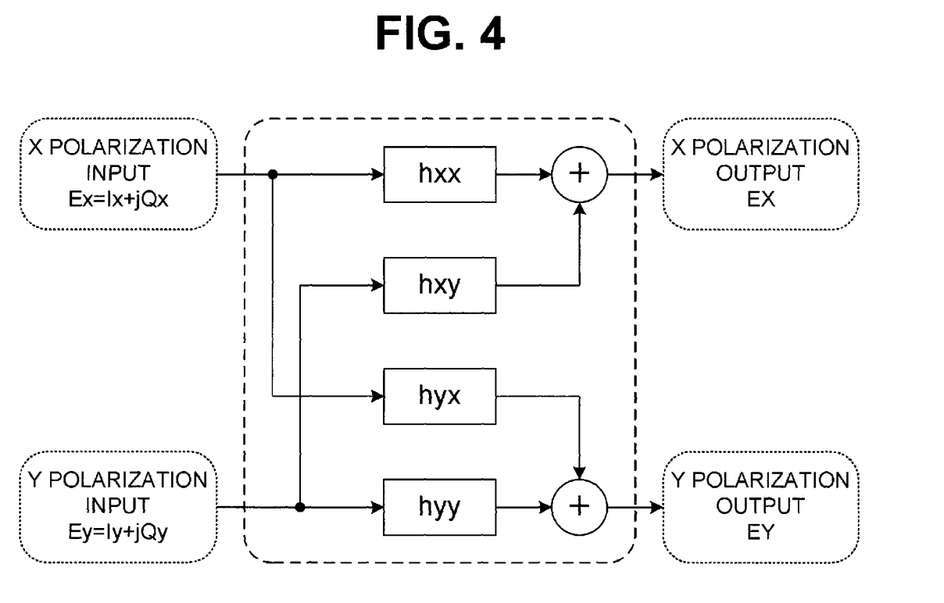
FIG. 4 is a view for explaining a butterfly FIR filter used in an optical reception device according to the second exemplary embodiment.

FIG. 4 is a view for conceptually explaining the butterfly FIR filter used in the polarization tracking unit 242. As shown in FIG. 4, when the butterfly FIR filter used in the polarization tracking unit 242 receives the electric field component (Ex=Ix+jQx) of the X polarization channel and the electric field component (Ey=Iy+jQy) of the Y polarization channel in a DP-QPSK signal serving as input data to the optical reception device 20 according to this exemplary embodiment, it outputs output signals Ex and Ey of the respective polarization components having undergone polarization fluctuation compensation.

The output signals Ex and Ey can be given by a relation represented by equation (1) using a so-called Jones matrix:

[Mathematical 1]

$$\begin{pmatrix} Ex \\ Ey \end{pmatrix} = \begin{pmatrix} h_{xx} & h_{xy} \\ h_{yx} & h_{yy} \end{pmatrix} \begin{pmatrix} E_x \\ E_y \end{pmatrix} \quad (1)$$

where $h_{xx}$, $h_{xy}$, $h_{yx}$, and $h_{yy}$ are row vectors corresponding to a dimension indicated by the number of taps of the FIR filter.

Figure 5:
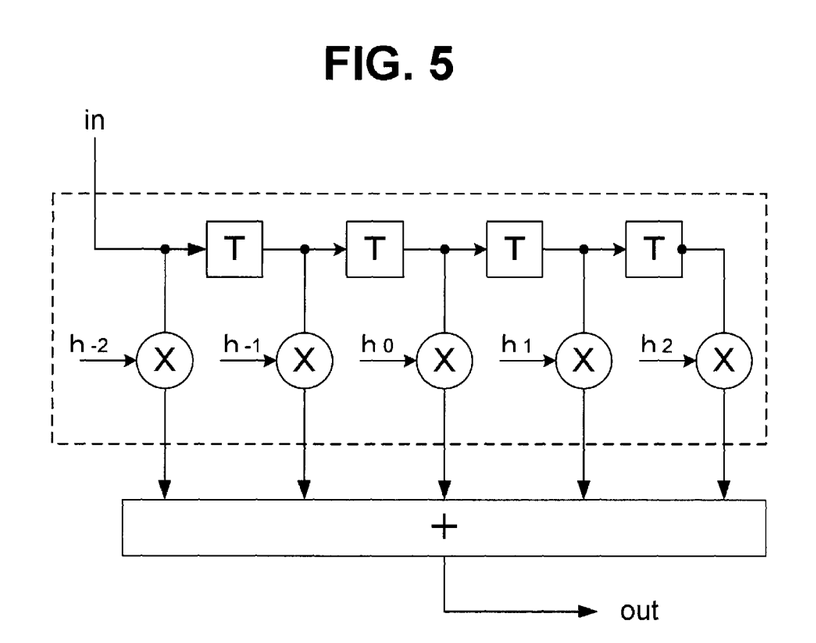
FIG. 5 is a view for conceptually explaining an equalizer as an example of the butterfly FIR filter in the optical reception device according to the second exemplary embodiment.

For example, FIG. 5 is a view conceptually showing the equalizer of the butterfly FIR filter used in the polarization tracking unit 242 when the dimension indicated by the number of taps of the FIR filter shown in FIG. 4 is 5. When the dimension indicated by the number of taps of the FIR filter is 5, as shown in FIG. 5, $h_{xx}$, $h_{xy}$, $h_{yx}$, and $h_{yy}$ in equation (1) can be given by row vectors in equations (2):

[Mathematical 2]

$$h_{xx} = [h_{-2}^{(xx)} h_{-1}^{(xx)} h_0^{(xx)} h_1^{(xx)} h_2^{(xx)}], \quad h_{xy} = [h_{-2}^{(xy)} h_{-1}^{(xy)} h_0^{(xy)} h_1^{(xy)} h_2^{(xy)}]$$

$$h_{yx} = [h_{-2}^{(yx)} h_{-1}^{(yx)} h_0^{(yx)} h_1^{(yx)} h_2^{(yx)}], \quad h_{yy} = [h_{-2}^{(yy)} h_{-1}^{(yy)} h_0^{(yy)} h_1^{(yy)} h_2^{(yy)}] \quad (2)$$

For the FIR filter used in the polarization tracking unit 242, as shown in FIG. 4, the tap coefficient estimation unit 231 estimates, according to the CMA method, the row vectors (row vectors represented by equations (2) when the dimension indicated by the number of taps is 5) of the Jones matrix that correspond to the dimension indicated by the number of taps of the FIR filter represented by equation (1). Based on the estimation result, the tap coefficient estimation unit 231 sets the weighting coefficients of the taps of the FIR filter.

Based on the weighting coefficients of the taps of the FIR filter that are set by the tap coefficient estimation unit 231, the DGD monitoring unit 232 detects a DGD between the polarization component signals of the DP-QPSK signal received by the optical reception device 20 according to this exemplary embodiment, and monitors the DGD amount of the DP-QPSK signal.

The relationship between the DGD amount of the DP-QPSK signal and the row vector components of the Jones matrix that correspond to a dimension indicated by the number of taps of the FIR filter will be explained.

FIGS. 6A to 6D show the simulation results of an FIR filter used in the polarization tracking unit 242 in which the dimension indicated by the number of taps is 5 when a DGD equivalent to 1.1 UI (40 ps) is added to a DP-QPSK signal having a 28-Gbps symbol rate and the signal is input to the optical reception device 20 according to this exemplary embodiment at a polarization rotation angle of 30°.

As shown in FIGS. 6A to 6D, attention is paid to diagonal terms $h_{xy}$ (FIG. 6B) and $h_{yx}$ (FIG. 6C) in the Jones matrix representing polarization mixture components between the X and Y polarization channels. In $h_{xy}$ shown in FIG. 6B, the 0th-order tap term has a large value for DGD=0 ps (polarization mixture component between the polarization channels is large). To the contrary, the −1st-order tap term has a large value for DGD=40 ps.

Figure 6A:
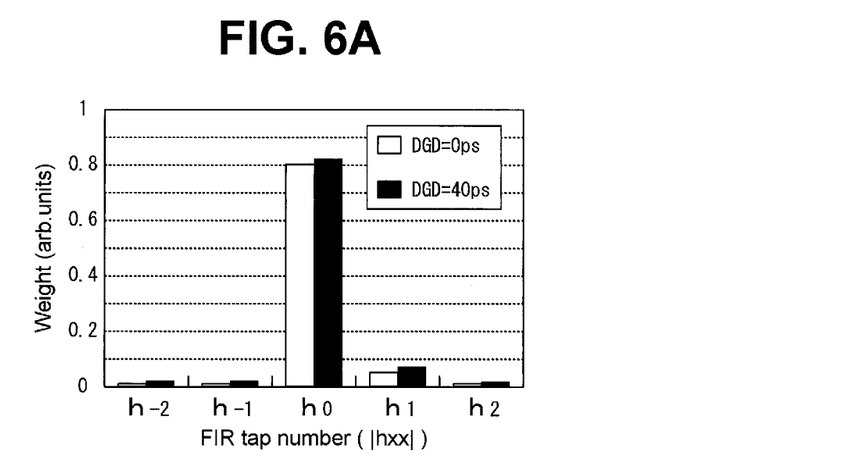
FIG. 6A is a graph showing the simulation results of $h_{xx}$ out of the simulation results of the butterfly FIR filter in the optical reception device according to the second exemplary embodiment.
Figure 6B:
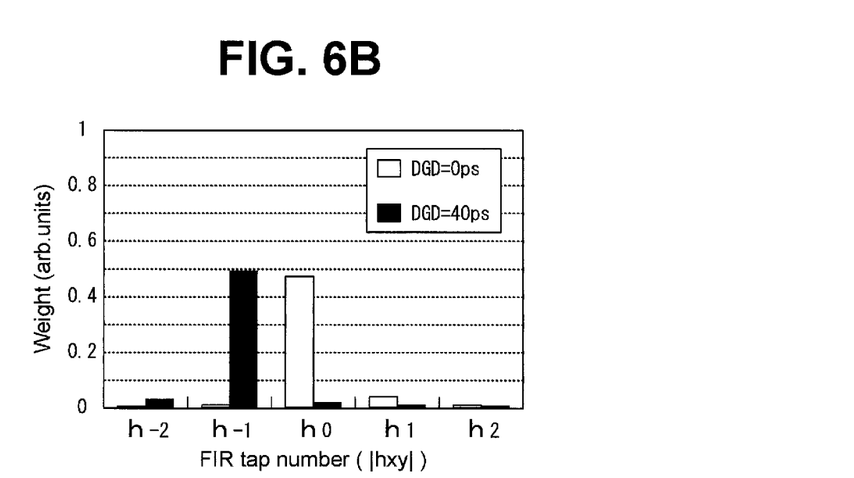
FIG. 6B is a graph showing the simulation results of $h_{xy}$ out of the simulation results of the butterfly FIR filter in the optical reception device according to the second exemplary embodiment.
Figure 6C:
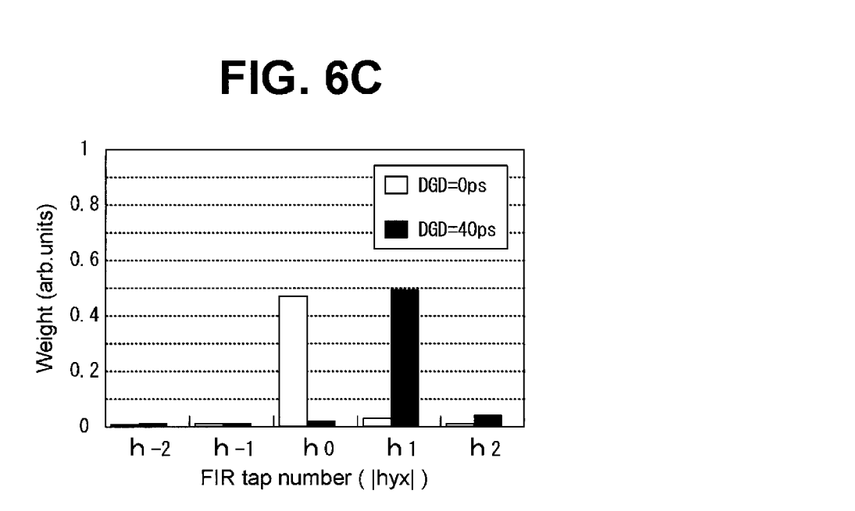
FIG. 6C is a graph showing the simulation results of $h_{yx}$ out of the simulation results of the butterfly FIR filter in the optical reception device according to the second exemplary embodiment.
Figure 6D:
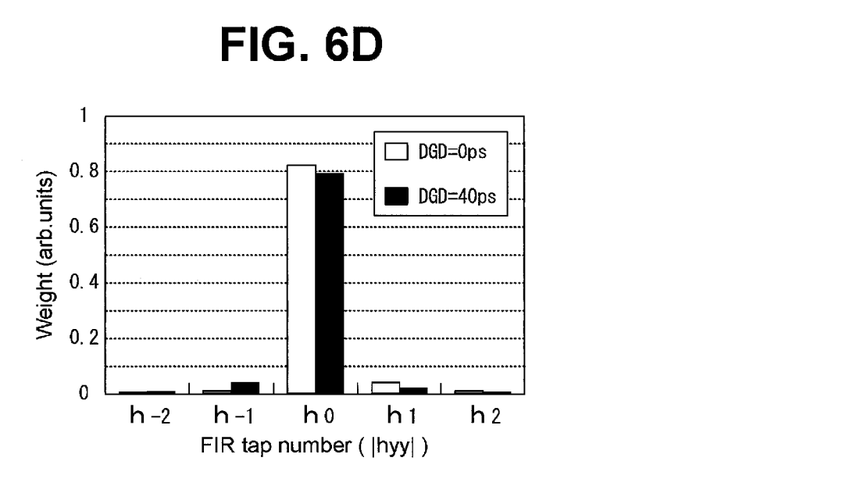
FIG. 6D is a graph showing the simulation results of $h_{yy}$ out of the simulation results of the butterfly FIR filter in the optical reception device according to the second exemplary embodiment.

When attention is paid to $h_{yx}$ shown in FIG. 6C, the 0th-order tap term has a large value for DGD=0 ps, similar to the characteristic of $h_{xy}$. However, the 1st-order tap term has a large value for DGD=40 ps.

In this way, adding a DGD changes the row vector components of the Jones matrix representing polarization mixture components between the polarization channels. More specifically, the weighting coefficients of the taps of the butterfly FIR filter used in the CMA method spread. Based on the spread of the weighting coefficients of the taps, the DGD monitoring unit 232 monitors the DGD amount of the DP-QPSK signal serving as input data.

Letting $h_0$ be the absolute value of a weighting coefficient corresponding to one polarization component signal at the center tap of the FIR filter, and $h_k$ be the absolute value of a weighting coefficient corresponding to the other polarization component signal at the kth (k is an integer) tap from the center tap, it can be estimated that the DGD amount of the DP-QPSK signal that is added on the transmission line and monitored by the DGD monitoring unit 232 is proportional to a value derived by dividing, by $h_0$, the sum of values at all taps that is represented by $k \times h_k$.

In the above-described example regarding estimation of the DGD amount of the DP-QPSK signal that is added on the transmission line and monitored by the DGD monitoring unit 232, the weighting coefficients of taps in all the orders of the FIR filter are added. Instead, the DGD amount may be estimated using the weighting coefficients of some typical taps.

More specifically, letting $h_o$ be the absolute value of a weighting coefficient corresponding to one polarization component signal at the center tap of the FIR filter, $h_n$ (n is an integer) be the maximum absolute value among the absolute values of weighting coefficients corresponding to the other polarization component signals at taps except for the center tap, and $h_m$ (m is an integer) be the second maximum absolute value, it can be estimated that the DGD amount of the DP-QPSK signal that is added on the transmission line is proportional to a value represented by $(n \times h_n + m \times h_m)/h_0$.

Further, the weighting coefficients of some other typical taps may be used. In this case, letting $h_0$ be the absolute value of a weighting coefficient corresponding to one polarization component signal at the center tap of the FIR filter, and $h_n$ (n is an integer) be the maximum absolute value among the absolute values of weighting coefficients corresponding to the other polarization component signals at taps except for the center tap, it can be estimated that the DGD amount of the DP-QPSK signal that is added on the transmission line is proportional to a value represented by $n \times h_n/h_0$.

The DGD monitoring unit 232 monitors the DGD amount of the DP-QPSK signal received by the optical reception device 20 based on the above-mentioned estimation of the DGD amount of the DP-QPSK signal that is added on the transmission line, and the spread of the weighting coefficients of the taps of the FIR filter.

The phase difference setting unit 233 detects a phase difference between the X and Y polarization channels based on the result of monitoring the DGD amount by the DGD monitoring unit 232. Based on the detected phase difference, the phase difference setting unit 233 adjusts A/D identification clocks which are output from the A/D identification clock generator 250 for the respective polarization components of the DP-QPSK signal. The phase difference setting unit 233 outputs the adjusted A/D identification clocks to the A/D converters 221a to 221d corresponding to the respective polarization component signals of the DP-QPSK signal.

The A/D identification clock output from the A/D identification clock generator 250 may be a clock signal digitally extracted by the A/D identification clock generator 250 from data output from the signal processor 220, or a clock signal analog-extracted by the A/D identification clock generator 250 from a DP-QPSK signal serving as an input signal.

Note that each function of the optical reception device 20 according to this exemplary embodiment is implemented by installing a computer program (software) in a computer including a CPU (Central Processing Unit), memory, and interface mounted in the optical reception device 20. Each function is implemented by various hardware resources of the computer and the computer program in cooperation with each other. Note that the computer program may be provided in a state in which it is stored in a computer-readable recording medium.

Each function of the optical reception device 20 according to this exemplary embodiment can also be implemented by integrating the program algorithm of the function into a large-scale semiconductor integrated circuit such as FPGA (Field Programmable Gate Array) or ASIC (Application Specific Integrated Circuit).

The operation of the optical reception device 20 according to this exemplary embodiment will be explained with reference to a flowchart shown in FIG. 7.

Figure 7:
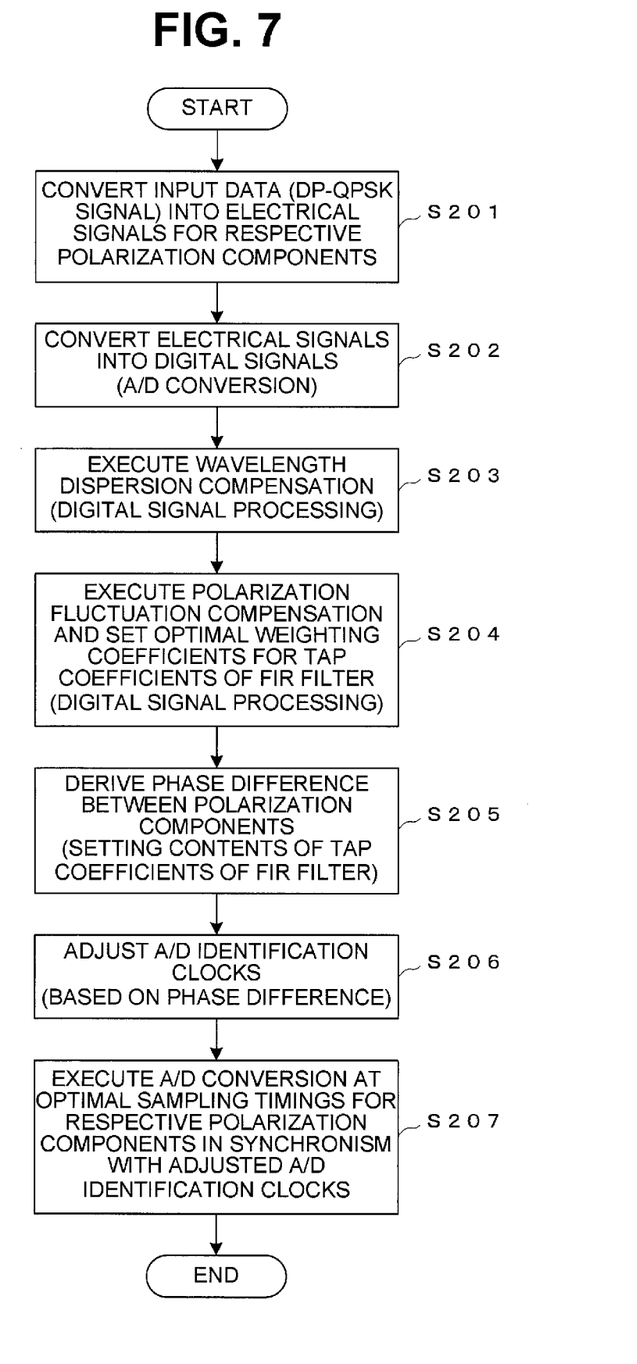
FIG. 7 is a flowchart showing an operation in the optical reception device according to the second exemplary embodiment.

As shown in FIG. 7, when the optical reception device 20 receives a DP-QPSK signal, the electrical signal converter 210 photoelectrically converts respective polarization component signals multiplexed on the received DP-QPSK signal into electrical signals (S201).

After conversion into electrical signals by the electrical signal converter 210, the A/D converter 221 of the signal processor 220 A/D-converts the electrical signals corresponding to the respective polarization component signals of the DP-QPSK signal into digital signals (S202).

After the A/D converter 221 A/D-converts the electrical signals corresponding to the respective polarization component signals of the DP-QPSK signal, the wavelength dispersion compensator 241 of the distortion compensation processor 240 performs digital signal processing for the A/D-converted digital signals, and compensates for wavelength dispersion generated in the DP-QPSK signal serving as the received signal (S203).

After the wavelength dispersion compensator 241 compensates for wavelength dispersion by digital signal processing, the polarization tracking unit 242 cancels, by the CMA method, linear coupling of the X and Y polarization components of the DP-QPSK signal that is caused by polarization fluctuations generated on a transmission line such as an optical fiber. When compensating for polarization fluctuations generated between the polarization component signals of the DP-QPSK signal, the tap coefficient estimation unit 231 estimates tap coefficients representing the structure of an FIR filter used the CMA method executed by the polarization tracking unit 242, and sets the structure of the FIR filter (S204).

After the tap coefficient estimation unit 231 estimates the tap coefficients of the FIR filter and sets the structure, the DGD monitoring unit 232 monitors, from the set FIR filter structure, i.e., the tap coefficients of the FIR filter, the DGD amount of the DP-QPSK signal that is added on the transmission line. Based on the result of monitoring the DGD amount by the DGD monitoring unit 232, the phase difference setting unit 233 detects a phase difference between the X and Y polarization channels of the DP-QPSK signal (S205).

After the phase difference setting unit 233 detects the phase difference between the X and Y polarization channels of the DP-QPSK signal, the phase difference setting unit 233 adjusts, based on the detected phase difference, the phases of A/D identification clocks corresponding to the respective polarization components of the DP-QPSK signal that are output from the A/D identification clock generator 250 (S206).

After adjusting the phases of the A/D identification clocks, the phase difference setting unit 233 outputs the A/D identification clocks phase-adjusted by the phase difference setting unit to the A/D converter 221. The A/D converter 221 executes A/D conversion processing at optimal sampling timings for the respective polarization components of the DP-QPSK signal (S207).

In this manner, the optical reception device according to this exemplary embodiment monitors a phase difference between the polarization component signals of a DP-QPSK signal serving as an input signal based on the weighting coefficients of the taps of the FIR filter used in the CMA method, and adjusts the sampling timings of A/D conversion processing based on the monitoring result. The optical reception device can execute A/D conversion processing at optimal sampling timings for the respective polarization component signals of the DP-QPSK signal.

Even when polarization fluctuations caused by a rapidly temporally varying DGD occur in a DP-QPSK signal serving as an input signal, the input signal can be received without degrading the reception precision.

Oversampling by high-speed A/D conversion processing need not be executed to avoid polarization fluctuations caused by a rapidly temporally varying DGD. Even by low-speed A/D conversion processing (for example, a sampling precision of four or less samples per symbol), an input signal can be received without degrading the reception precision.

Third Exemplary Embodiment

An optical reception device according to the third exemplary embodiment of the present invention prevents degradation of the reception precision based on a phase difference between the polarization component signals of a received DP-QPSK signal by executing data interpolation by resampling of digital signals.

As for the building components of the optical reception device according to the third exemplary embodiment, the same reference numerals as those of the optical reception device 20 described in the second exemplary embodiment denote building components having the same arrangements and functions, and a detailed description thereof will not be repeated.

Figure 8:
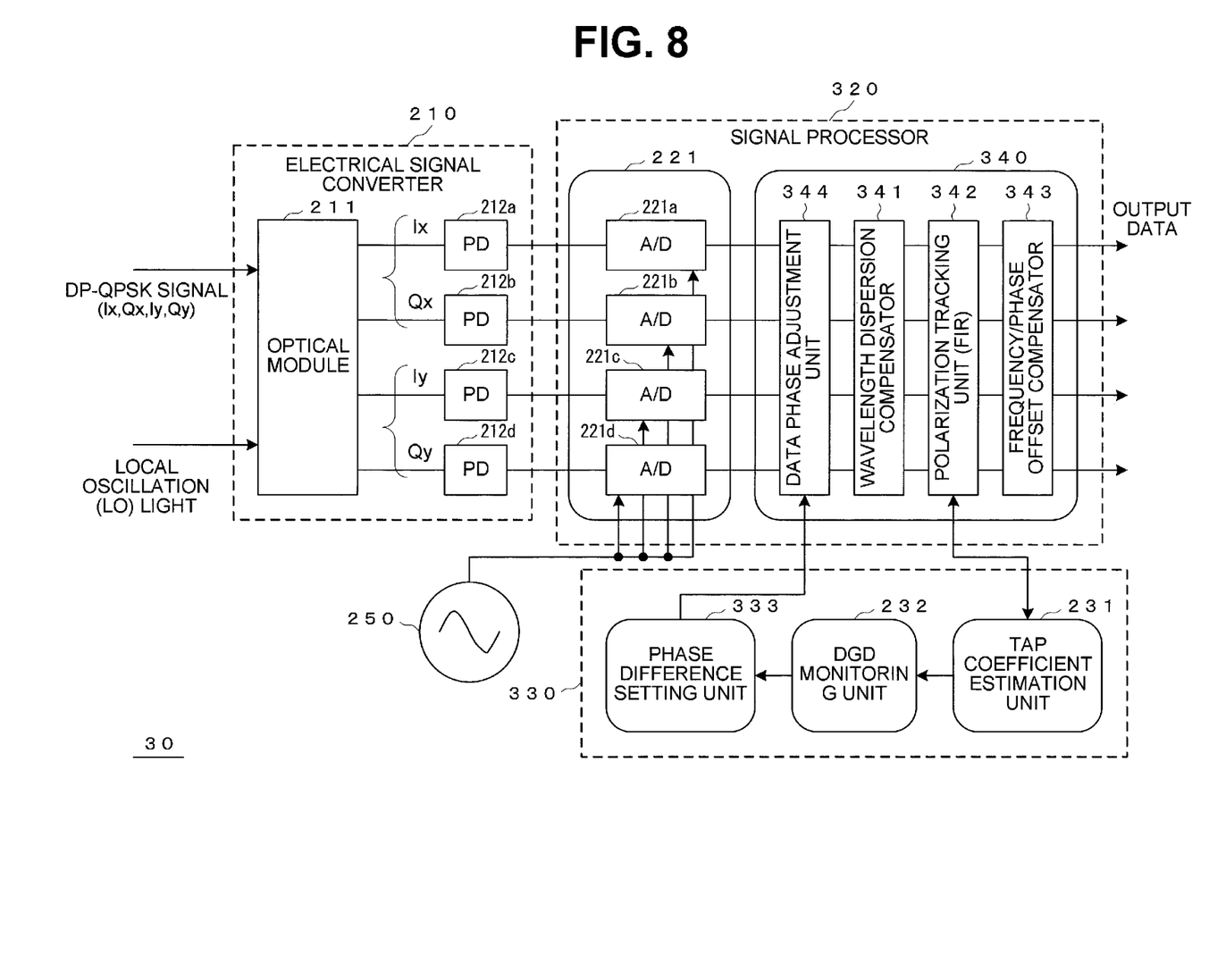
FIG. 8 is a block diagram showing the arrangement of an optical reception device according to the third exemplary embodiment of the present invention.

As shown in FIG. 8, an optical reception device 30 according to this exemplary embodiment includes an electrical signal converter 210 which converts a received DP-QPSK signal into electrical signals, a signal processor 320 which executes signal processing for the electrical signals corresponding to the received DP-QPSK signal, a phase difference output unit 330 which detects a phase difference between the polarization component signals of the received DP-QPSK signal, and an A/D identification clock generator 250 which outputs A/D identification clocks synchronized with sampling timings in A/D conversion processing.

The signal processor 320 includes an A/D converter 221 which executes A/D conversion processing, and a distortion compensation processor 340 which executes digital signal processing for digital signals after A/D conversion processing.

The distortion compensation processor 340 includes a wavelength dispersion compensator 341 which executes digital signal processing to compensate for wavelength dispersion generated in a DP-QPSK signal, a polarization tracking unit 342 which compensates for polarization fluctuations generated in the DP-QPSK signal using the CMA method, a frequency/phase offset compensator 343 which executes digital signal processing to compensate for an offset arising from a difference in frequency or phase between the DP-QPSK signal and local oscillation (LO) light, and a data phase adjustment unit 344 which executes digital signal processing to perform data interpolation by resampling based on information representing a phase difference between the polarization components of the DP-QPSK signal that is output from the phase difference output unit 330 to be described later.

Digital signal processing executed by the data phase adjustment unit 344 to perform data interpolation by resampling can be implemented by digital signal processing such as linear interpolation, up-sampling, or rate conversion using an interpolation filter.

The phase difference output unit 330 includes a tap coefficient estimation unit 231 which estimates the tap coefficients of a butterfly FIR filter used in polarization fluctuation compensation executed by the polarization tracking unit 342, a DGD monitoring unit 232 which monitors the DGD amount of the DP-QPSK signal based on the weighting coefficients of the taps of the butterfly FIR filter, and a phase difference setting unit 333 which detects a phase difference between the polarization components of the DP-QPSK signal based on the DGD amount monitoring result and outputs it to the signal processor 320.

Note that each function of the optical reception device 30 according to this exemplary embodiment is implemented by installing a computer program (software) in a computer including a CPU (Central Processing Unit), memory, and interface mounted in the optical reception device 30. Each function is implemented by various hardware resources of the computer and the computer program in cooperation with each other. Note that the computer program may be provided in a state in which it is stored in a computer-readable recording medium.

Each function of the optical reception device 30 according to this exemplary embodiment can also be implemented by integrating the program algorithm of the function into a large-scale semiconductor integrated circuit such as FPGA (Field Programmable Gate Array) or ASIC (Application Specific Integrated Circuit).

The operation of the optical reception device 30 according to this exemplary embodiment will be explained.

The optical reception device 30 according to this exemplary embodiment detects a phase difference between the polarization component signals of a DP-QPSK signal serving as a received signal, based on the DGD amount of the DP-QPSK signal that is derived from the weighting coefficients of the taps of the butterfly FIR filter used in the CMA method. The optical reception device 30 performs data interpolation by resampling A/D-converted digital signals based on the detected phase difference. The optical reception device 30 then adjusts sampling phases, that is, identifies data at optimal sampling timings for the respective polarization component signals of the DP-QPSK signal.

Even when polarization fluctuations caused by a rapidly temporally varying DGD occur in a DP-QPSK signal serving as an input signal, the input signal can be received without degrading the reception precision.

The optical reception device 30 according to this exemplary embodiment may execute the above-mentioned sampling phase adjustment in addition to sampling timing adjustment in A/D conversion processing executed in the optical reception device 20 described in the second exemplary embodiment. It may also be selected to execute both or either of sampling timing adjustment in A/D conversion processing and sampling phase adjustment by resampling digital signals, in accordance with a condition such as necessary reception precision, the interface of a device for use, or the arrangement of a communication system.

In the above-described exemplary embodiments, the phase difference between the polarization component signals of a polarization multiplexed signal does not always arise from a DGD added on the transmission line. The phase difference may arise from temperature variations or aging of the optical module (90° hybrid) used in the electrical signal converter 110 or 210 or a component used in another building component. Needless to say, the functions of the optical reception devices 20 and 30 according to the exemplary embodiments may be applied to a phase difference generated by all these factors between the polarization component signals of a polarization multiplexed signal.

As for input signals to the optical reception devices 10, 20, and 30 according to the above exemplary embodiments, a polarization multiplexed signal serving as an optical signal has been described as the input signal. However, an operation after photoelectric conversion is an operation common to general telecommunications. Hence, applications of the present invention are not always limited to optical communication.

Some or all of the above exemplary embodiments can be described as follows but are not limited to the following description.

This application is based upon and claims the benefit of priority from Japanese Patent Application No. 2009-266065, filed on Nov. 24, 2009, the disclosure of which is incorporated herein in its entirety by reference.

INDUSTRIAL APPLICABILITY

The present invention is applicable to an optical reception device using a digital coherent reception method in a high-speed optical communication system, and a radio receiver which receives a polarization multiplexed radio signal in a radio communication system.

EXPLANATION OF THE REFERENCE NUMERALS AND SIGNS

10 . . . optical reception device, 110 . . . electrical signal converter, 120 . . . signal processor, 130 . . . phase difference output unit

The invention claimed is:

1. An optical reception device comprising:
an electrical signal converter that converts, into electrical signals, respective polarization components of a polarization multiplexed signal forming an optical signal in which the polarization components are multiplexed;
a signal processor that executes A/D conversion processing for the electrical signals output from said electrical signal converter and digital signal processing for digital signals generated by the A/D conversion processing; and
a phase difference output unit that detects a phase difference generated between the polarization components of the polarization multiplexed signal based on the digital signals output from said signal processor, and outputs information representing the phase difference,
wherein said signal processor compensates for a distortion of the polarization multiplexed signal based on the information representing the phase difference that is output from said phase difference output unit,
wherein said signal processor includes:
an A/D converter that converts the electrical signals into digital signals at predetermined sampling timings by executing the A/D conversion processing,
an FIR filter which receives, as input signals, the digital signals output from said A/D converter and has a predetermined number of taps, and
a distortion compensation processor that compensates for a distortion of the polarization multiplexed signal based on the information representing the phase difference that is output from said phase difference output unit, and
wherein said phase difference output unit includes
a tap coefficient estimation unit that estimates weighting coefficients for weighting tap coefficients of the FIR filter, and a phase difference correction unit that derives the phase difference between the polarization components of the polarization multiplexed signal based on the weighting coefficients, and outputs, to said signal processor, information representing the derived phase difference.

2. An optical reception device according to claim 1, wherein as distortion compensation of the polarization multiplexed signal, said signal processor adjusts a sampling timing of the A/D conversion processing in accordance with the information representing the phase difference.

3. An optical reception device according to claim 1, wherein as distortion compensation of the polarization multiplexed signal, said signal processor executes digital signal processing to perform data interpolation by resampling for the digital signals in accordance with the information representing the phase difference.

4. An optical reception device according to claim 1, wherein letting $h_0$ be an absolute value of a weighting coefficient corresponding to a signal of one polarization component at a center tap of the FIR filter, and $h_k$ be an absolute value of a weighting coefficient corresponding to a signal of the other polarization component at a kth (k is an integer) tap from the center tap, said phase difference correction unit sets, as the phase difference, a value derived by dividing, by $h_0$, a sum of values at all taps of the FIR filter that is represented by $k \times h_k$.

5. An optical reception device according to claim 1, wherein letting $h_0$ be an absolute value of a weighting coefficient corresponding to a signal of one polarization component at a center tap of the FIR filter, $h_n$ (n is an integer) be a maximum absolute value among absolute values of weighting coefficients corresponding to signals of the other polarization components at taps except for the center tap, and $h_m$ (m is an integer) be a second maximum absolute value, said phase difference correction unit sets, as the phase difference, a value represented by $(n \times h_n + m \times h_m)/h_0$.

6. An optical reception device according to claim 1, wherein letting $h_0$ be an absolute value of a weighting coefficient corresponding to a signal of one polarization component at a center tap of the FIR filter, and $h_n$ (n is an integer) be a maximum absolute value among absolute values of weighting coefficients corresponding to signals of the other polarization components at taps except for the center tap, said phase difference correction unit sets, as the phase difference, a value represented by $n \times h_n/h_0$.

7. An optical reception device according to claim 1, wherein said A/D converter converts the electrical signals into the digital signals at the sampling timing of not more than four samples per symbol.

8. An optical reception control method comprising:
converting, into electrical signals, respective polarization components of a polarization multiplexed signal forming an optical signal in which the polarization components are multiplexed;
executing A/D conversion processing for the electrical signals to generate digital signals;
executing digital signal processing for the digital signals;
detecting a phase difference generated between the polarization components of the polarization multiplexed signal based on the digital signals having undergone the digital signal processing and outputting information representing the phase difference; and
compensating for a distortion of the polarization multiplexed signal based on the information representing the phase difference;

converting the electrical signals into digital signals at predetermined sampling timings;
receiving, as input signals, the digital signals;
estimating weighting coefficients for weighting tap coefficients;
deriving the phase difference between the polarization components of the polarization multiplexed signal based on the weighting coefficients; and
outputting information representing the derived phase difference.

9. An optical reception control method according to claim 8, wherein in compensating for a distortion, as distortion compensation of the polarization multiplexed signal, a sampling timing of the A/D conversion processing is adjusted in accordance with the information representing the phase difference.

10. An optical reception control method according to claim 8, wherein in compensating for a distortion, as distortion compensation of the polarization multiplexed signal, digital signal processing is executed to perform data interpolation by resampling for the digital signals in accordance with the information representing the phase difference.

11. An optical communication system comprising:
an optical transmitter that transmits an optical signal in which polarization components are multiplexed; and
an optical reception device that is connected to said optical transmitter via an optical transmission line and receives the optical signal,
said optical reception device including:
an electrical signal converter that converts, into electrical signals, respective polarization components of a polarization multiplexed signal forming the optical signal in which the polarization components are multiplexed;
an A/D converter that executes A/D conversion processing for the electrical signals output from said electrical signal converter to output digital signals;
a digital signal processor that executes digital signal processing for the digital signals output from said A/D converter;
a phase difference output unit that detects a phase difference generated between the polarization components of the polarization multiplexed signal based on the digital signals output from said digital signal processor, and outputs information representing the phase difference; and
a distortion compensation processor that compensates for a distortion of the polarization multiplexed signal based on the information representing the phase difference that is output from said phase difference output unit;
an FIR filter which receives, as input signals, the digital signals output from said A/D converter and has a predetermined number of taps,
wherein the A/D converter converts the electrical signals into digital signals at predetermined sampling timings, and
wherein said phase difference output unit further comprises:
a phase difference correction unit that derives the phase difference between the polarization components of the polarization multiplexed signal based on the weighting coefficients, and outputs, to said digital signal processor, information representing the derived phase difference.

* * * * *